Dec. 13, 1932.  A. P. ARMINGTON  1,891,019
DUMPING VEHICLE
Filed Jan. 5, 1932
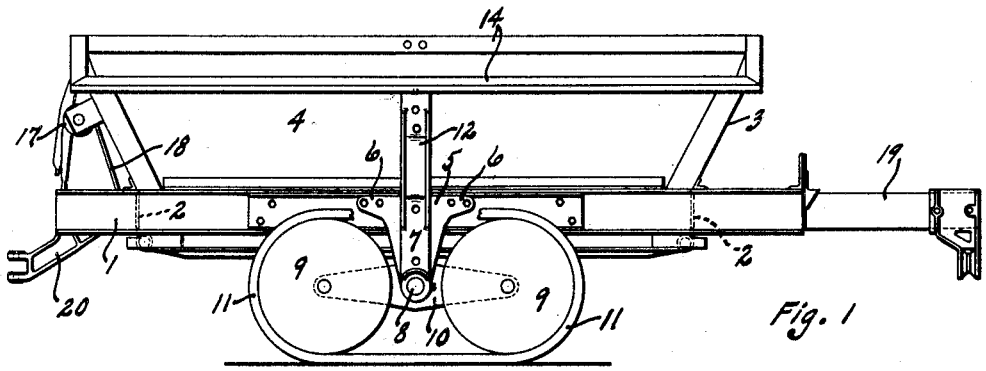
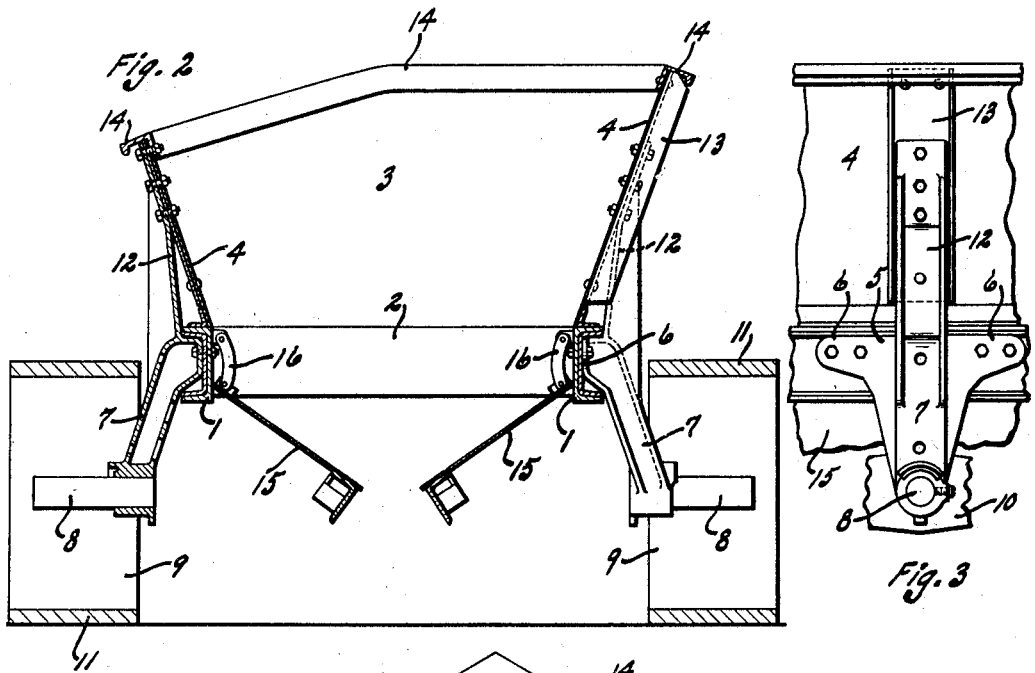
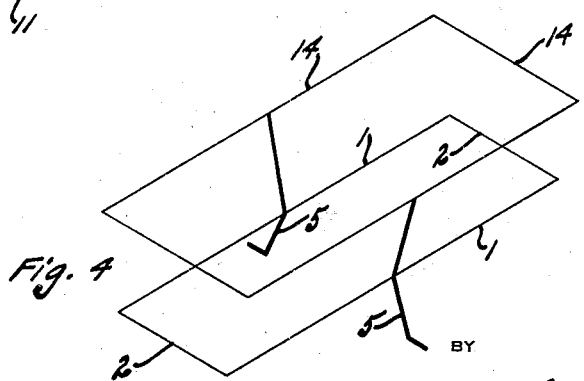
INVENTOR
Arthur P. Armington
BY
Brockett, Hyde, Higley & Meyer
ATTORNEYS Patented Dec. 13, 1932

1,891,019

UNITED STATES PATENT OFFICE

ARTHUR P. ARMINGTON, OF WILLOUGHBY, OHIO, ASSIGNOR TO THE EUCLID ROAD MACHINERY COMPANY, OF EUCLID, OHIO, A CORPORATION OF OHIO

DUMPING VEHICLE

Application filed January 5, 1932. Serial No. 584,803.

This invention relates to heavy-duty bottom-dump vehicles of the cart class, such as that illustrated and described in Patent No. 1,752,056 issued March 25, 1930 to Stewart F. Armington and me.

Such a vehicle comprises a bottom dumping load container supported in elevated position upon a single pair of medially located wheel means such as the well known crawler type of wheel substitute, the vehicle including a rigidly associated drawbar attachable directly to a tractor or the like whereby in operation the body may be maintained level and thus balanced over its supporting structure. Elevation of the body is required that the dumped load may be cleared and that the swinging doors usually employed may clear the ground in dumping position.

The obvious provision for this body elevation, and the means employed heretofore in the art, is an arched axle having its central transverse member extending across the body and thus obstructing the dumping opening. An object of my invention is to eliminate such obstruction.

The body preferably has sloping sides, so that clearance at the dumping opening becomes particularly important, this opening being already in the zone of minimum passage area.

The body is considerably longer than its width and it has consequently heretofore been found necessary that the body sides be tied together against the spreading tendency of the load, as by means forming a partition or other obstruction in the plane of the axle. It is a further object of this invention to eliminate such obstruction also, by structure utilizing the spreading tendency of the load against the upper portion of the body sides, to resist the spreading tendency of the wheel means heretofore resisted by the central axle member. Thus the more load in the body, and consequently the more spreading tendency of the wheel means, the more is this spreading tendency resisted.

Another object is to provide a form of bracket wherein the wheel means may be at the sides of the body and the sides of the latter may be sloping yet cooperate with the brackets as described. Also the form of the brackets is such that the body may have side frame members of structural steel elements uninterrupted to accommodate the brackets.

Still another object is to combine with the described structure a single pair of full length dumping doors so associated with the body that the latter may have reinforcements from the doors under certain conditions.

The exact nature of this invention together with further objects and advantages thereof will be apparent from the following description taken in connection with the accompanying drawing, in which Fig. 1 is a side elevation of an embodiment of the invention; Fig. 2 is a transverse sectional elevation thereof showing details of construction; Fig. 3 is a detail in elevation of the nearer bracket Fig. 2 and its associated parts; Fig. 4 is a diagrammatic illustration of the general structural relationship of the parts; and Fig. 5 is a detail showing an optional form of door mounting hinge.

With reference now to the drawing, the load container of the vehicle is a body having a horizontal frame of side members 1 and end members 2 arranged to define an unobstructed opening. Body end and side walls 3 and 4 are arranged to extend upwardly from the frame to provide an open hopper having an unobstructed dumping opening. These body walls preferably extend outwardly as they rise from the frame, as shown.

A bracket 5 is arranged intermediate the ends of each side frame member 1, and preferably medial of the body ends. The brackets have laterally extending flanges 6 by which the brackets are bolted to the side frame members.

Each bracket 5 has an arm 7 extending below its side frame member and outwardly thereof to carry a stub shaft 8 for connection with wheel means. The arm 7 may preferably be hollow as indicated Fig. 2.

The wheel means shown is of crawler type including as its principal elements a pair or more of wheels 9 mounted upon a rock beam 10 which latter is mounted upon the stub shaft 8, and an endless tread linkage 11 trained about the wheels 9. Such wheel means, being well known in the art, are here shown conventionally only.

Each bracket 5 has an arm 12 extending above the frame alongside the corresponding body side wall and to the top of the latter, the arm 5 being preferably flanged as indicated to provide a U-section. The side frame members 1 may be of channel form in which case the bracket arms 12 are arched to clear the upper flanges as indicated Fig. 2. In the body shown one of the side walls 4 is higher than the other. That both brackets may be cast from the same pattern, the bracket arms 12 are made to fit the lower side wall (left-hand, Fig. 2), and upon the high side of the vehicle a channel 13 or other reinforcing means is interposed between the bracket arm 12 and the body side wall 4 to, in effect, extend the bracket arm to the top of the side wall. As shown the channel 13 has its flanges sufficiently spaced to embrace the bracket arm 12, the flanges being turned outwardly.

At the upper extremity of the body, as extending thereabout, along the upper edges of the body walls, I provide reinforcing means 14 which may be in the form of bulb angles as indicated Fig. 2. The bulb angles are joined with each other at the corners of the body, with the body side walls, and with the bracket arms 12 as indicated. On the high side of the vehicle the channel 13 serves to connect the parts, the flanges of the channel at its upper extremity being trimmed to fit the bulb angle as shown Fig. 2. Thus in effect a second frame is formed, extending about the upper periphery of the body and joined with the lower frame at the base of the body, by the bracket arms 12 extending between the frames, the body side walls acting as webs between the frames. This frame arrangement is illustrated Fig. 4.

To control the dumping opening I provide a single pair of dumping doors 15 each extending the full length of the opening and arranged to move generally about one side thereof between horizontal load-carrying position and depending dumping position. For this purpose, as indicated Fig. 2, links 16 may serve to mount the doors upon the side frame members 1. At the rear of the vehicle the usual winding gear indicated at 17 has connection with the doors through a cable 18 for door control in the usual manner as will be understood by one familiar with the art.

Drawbar means 19 rigidly associated with the lower frame extends forwardly thereof and provides for direct hitch of the vehicle to a tractor. Hitch means 20 is secured with the frame at the rear of the latter, that a second similar vehicle may be hitched to the one shown.

The general operation of the vehicle will be quite as usual in the art, except that the body, including its dumping opening, not being divided or otherwise obstructed by any transverse members, the vehicle will handle solid materials such as rocks and stumps of greater size than before. Also, loose rock, sticky clay and the like will dump freely where it would not before.

The structural relationship of the frame parts, however, is such that these parts function in a new manner, as will appear from a consideration of Fig. 4. When the vehicle is loaded the weight of the load on the running gear tends to spread the latter, twisting the side frame members. Thus with reference to Fig. 2, the tendency would be to move the left-hand bracket clockwise and the right-hand bracket counter-clockwise. Another tendency of the load, however, is to spread transversely in the body, causing outward pressure against the body sides. This outward pressure is generally distributed along the sides; but by the frame members 14 thereof and the connection of the latter with the upper bracket arms 12, the spreading tendency of the load is concentrated upon the brackets to resist the spreading tendency exerted thereupon by the running gear. Whereas both these spreading tendencies, exerted by the running gear and by the load approximately neutralize each other as to torque exerted upon the side members 1 of the lower frame, regardless of the amount of the load; yet the forces tending to separate these side frame members are cumulative, varying with the load. Therefore the lower frame must have considerable strength against outward bending of its side members. But these conditions do not require any substantial addition of weight since the members 1 must in any event have great strength as cantilever beams to support the dead weight of the load in the body.

As has been described one of the functions of the upper frame formed by the members 14 is to concentrate the lateral thrusts of the load upon the upper bracket arms. Another and the usual function of such members is to reinforce the upper extremity of the body against impacts in loading. In addition, this upper frame connects the upper extremities of the brackets to resist angular motion of the latter about their lower frame members, yet without obstructing the container volume. The brackets may be considered as levers mounted upon the lower frame, from which it will be seen that the strength of the upper frame may be very considerably less than that of the lower frame.

When the doors are closed, which is always the case when the body is loaded, the latter is reinforced thereby if the doors fit within the dumping opening of the lower frame as they do when mounted as shown in Fig. 2; for when closed the doors extend between the side frame members 1 and thus combine to form a compression member resisting forces in those members tending to bend either toward the other. Such conditions though abnormal, frequently occur in operation, as when a vehicle is tipped sideways.

If instead of employing the links 16 shown in Fig. 2, the doors are hinged directly to the frame as indicated Fig. 5, then when the doors are closed, since they extend the full length of the body, they will act as webs or flanges reinforcing the side frame members against outward bending stresses imposed thereupon by the brackets as the vehicle is loaded. With such door arrangement the frame members will still be reinforced against inward bending as described in the above paragraph.

What I claim is:

1. In a vehicle of the class described, a frame defining an unobstructed opening, body walls arranged to extend upwardly from the frame to provide an open hopper having an unobstructed dumping opening, doors arranged to control said dumping opening, and bracket means secured intermediate the ends of each side frame member, extending therebelow and there associated with wheel means at the side of the frame, and extending substantially above the frame and associated with the corresponding body side wall to receive lateral outward thrust therefrom, whereby a load in said hopper will act through said brackets to relieve the side frame members from stresses in torque.

2. In a vehicle of the class described, a frame defining an unobstructed opening, body walls arranged to extend upwardly from the frame to provide an open hopper having an unobstructed dumping opening at said frame, doors arranged to control said dumping opening, bracket means secured intermediate the ends of each side frame member, extending therebelow and there associated with wheel means at the side of the frame, and extending substantially above the frame alongside the corresponding body side wall and to the top of the latter, and means associating the corresponding body side walls with the upper portions of said brackets to impart thereto the lateral spreading tendency of a load within the body.

3. In a vehicle of the class described, a frame defining an unobstructed opening at at said frame, body walls arranged to extend upwardly from the frame to provide an open hopper having an unobstructed dumping opening at said frame, doors arranged to control said dumping opening, the side walls of said body sloping outwardly from the frame, bracket means secured intermediate the ends of each side frame member, extending therebelow and there associated with wheel means, and extending above the frame alongside the corresponding body side wall and to the top of the latter, and means at the upper extremity of the body for interassociating the upper extremities of said bracket means.

4. In a vehicle of the class described, a frame defining an unobstructed opening, body walls arranged to extend upwardly from the frame to provide an open hopper having an unobstructed dumping opening, doors arranged to control said dumping opening, bracket means secured intermediate the ends of each side frame member, extending therebelow and there associated with wheel means at the side of the frame, and extending above the frame alongside the corresponding body side wall and to the top of the latter, and means extending about the upper extremity of the body for interassociating the upper extremities of said bracket means without obstructing the hopper opening.

5. In a heavy duty vehicle of the class described, an open frame of rigidly associated side and end members, each of said side members having intermediate its ends rigidly associated bracket means with an arm extending a substantial distance upwardly and outwardly and an arm extending downwardly thereof and there associated with wheel means beside the frame, a dump body comprising walls disposed to provide an open hopper, said hopper being secured with said frame to dump therethrough, and the side walls of said hopper fitting between said upwardly extending bracket arms, and door means for controlling the dumping opening and arranged for dumping disposition wherein said opening is substantially unobstructed.

6. In a vehicle of the class described, a pair of vertically spaced frames each defining an unobstructed opening, said frames being joined intermediate their ends by bracket means at the sides, said bracket means extending below the lower frame and being there associated with wheel means, walls connecting said frames to define an open hopper having an unobstructed bottom opening, and door means for controlling said opening.

7. In a vehicle of the class described, a pair of vertically spaced frames each defining an unobstructed opening, the upper frame being larger to define the larger opening, said frames being joined by bracket means at the sides, said bracket means having portions extending downwardly and outwardly from the lower frame and being associated with wheel means at the sides of the latter, walls connecting said frames to define an open hopper having sloping side walls and an unobstructed bottom opening, and door means for controlling said opening.

8. In a vehicle of the class described, a frame defining an unobstructed opening, body walls arranged to extend upwardly from the frame to provide an open hopper having an unobstructed dumping opening, doors arranged to control said dumping opening, and bracket means secured intermediate the ends of each side frame member, extending therebelow and there associated with wheel means at the side of the frame, and extending above the frame alongside the corresponding body side wall and to the top of the latter, the side frame members having laterally extending flanges, and said brackets being arched to clear said flanges.

In testimony whereof I hereby affix my signature.

ARTHUR P. ARMINGTON.